US012673380B2

(12) United States Patent
Osmanson

(10) Patent No.: US 12,673,380 B2
(45) Date of Patent: Jul. 7, 2026

(54) SYSTEM AND METHOD FOR PREVENTING STUB-OUTS IN GTAW

(71) Applicant: LIBURDI ENGINEERING LIMITED, Dundas (CA)

(72) Inventor: Dale Osmanson, Poulsbo, WA (US)

(73) Assignee: LIBURDI ENGINEERING LIMITED, Dundas (CA)

( * ) Notice: Subject to any disclaimer, the term of this patent is extended or adjusted under 35 U.S.C. 154(b) by 1112 days.

(21) Appl. No.: 17/526,707

(22) Filed: Nov. 15, 2021

(65) Prior Publication Data

US 2022/0152721 A1    May 19, 2022

Related U.S. Application Data

(60) Provisional application No. 63/114,419, filed on Nov. 16, 2020.

(51) Int. Cl.
    *B23K 9/095* (2006.01)
    *B23K 9/16* (2006.01)
(52) U.S. Cl.
    CPC ............ *B23K 9/0956* (2013.01); *B23K 9/164* (2013.01)
(58) Field of Classification Search
    CPC ...... B23K 9/164; B23K 9/0956; B23K 9/126; B23K 9/167

USPC ............ 219/130.21, 130.31, 130.32, 130.33
See application file for complete search history.

(56) References Cited

U.S. PATENT DOCUMENTS

| | | | | |
|---|---|---|---|---|
| 4,647,754 A | * | 3/1987 | Hirasawa ............... | B23K 9/091 |
| | | | | 219/130.21 |
| 5,187,348 A | * | 2/1993 | Cuba ...................... | B23K 9/067 |
| | | | | 219/124.02 |
| 2017/0165778 A1 | * | 6/2017 | Hsu .......................... | B23K 9/24 |
| 2020/0139472 A1 | * | 5/2020 | Erndt ..................... | B23K 9/092 |

FOREIGN PATENT DOCUMENTS

CN          110328435 B   * 10/2021   ............. B23K 9/167

* cited by examiner

*Primary Examiner* — Elizabeth M Kerr
*Assistant Examiner* — Simpson A Chen
(74) *Attorney, Agent, or Firm* — Womble Bond Dickinson (US) LLP

(57) ABSTRACT

A system and method for welding. In some embodiments, the system includes a tungsten electrode, an electrode position actuator, and a processing circuit. The processing circuit may be configured to detect contact between the tungsten electrode and a weld puddle, and, in response to detecting contact between the tungsten electrode and the weld puddle, to control the electrode position actuator to move the tungsten electrode out of contact with the weld puddle.

16 Claims, 4 Drawing Sheets

TUNGSTEN IS BROKEN FREE AND FILLER MATERIAL IS CUT

TUNGSTEN REMNANT

FILLER MATERIAL

WELD

TUNGSTEN IS EXCAVATED

EXCAVATION

WELD

SYSTEM AND METHOD FOR PREVENTING STUB-OUTS IN GTAW

CROSS-REFERENCE TO RELATED APPLICATION(S)

The present application claims priority to and the benefit of U.S. Provisional Application No. 63/114,419, filed Nov. 16, 2020, entitled "SYSTEM AND METHOD FOR PREVENTING STUB-OUTS IN GTAW", the entire content of which is incorporated herein by reference.

FIELD

One or more aspects of embodiments according to the present disclosure relate to arc welding, and more particularly to a system and method for preventing stub-outs in gas tungsten arc welding.

BACKGROUND

When performing gas tungsten arc welding, contact between the tungsten electrode and the weld puddle may result in a short circuit, and solidification of the weld puddle, with the tungsten electrode embedded in the solidified weld puddle. This situation may be referred to as a "stub-out". Recovering from a stub-out may be costly; thus, there is a need for a system and method for preventing stub-outs.

SUMMARY

According to an embodiment of the present disclosure, there is provided a system for welding, the system including: a tungsten electrode; an electrode position actuator; and a processing circuit, the processing circuit being configured: to detect contact between the tungsten electrode and a weld puddle; and in response to detecting contact between the tungsten electrode and the weld puddle, to control the electrode position actuator to move the tungsten electrode out of contact with the weld puddle.

In some embodiments, the system further includes an arc drive circuit controlled by the processing circuit, wherein the processing circuit is further configured to control the arc drive circuit to maintain a current through the tungsten electrode, after detecting contact between the tungsten electrode and the weld puddle.

In some embodiments, the system further includes a shielding gas controller controlled by the processing circuit, wherein the processing circuit is configured to cause shielding gas to continue flowing after detecting contact between the tungsten electrode and the weld puddle.

In some embodiments, the processing circuit is configured to cause the shielding gas to continue flowing after detecting contact between the tungsten electrode and the weld puddle for at least 0.2 seconds after detecting contact between the tungsten electrode and the weld puddle.

In some embodiments, the processing circuit is configured to cause the shielding gas to continue flowing, after detecting contact between the tungsten electrode and the weld puddle, until it receives a command from an operator to shut off the flow of shielding gas.

In some embodiments, the processing circuit is configured to control the electrode position actuator to move the tungsten electrode up by at least 0.05 inches within 0.5 seconds after detecting contact between the tungsten electrode and the weld puddle.

In some embodiments, the processing circuit is configured to operate, after moving the tungsten electrode out of contact with the weld puddle, with an arc voltage greater than before the contact between the tungsten electrode and the weld puddle.

In some embodiments, the processing circuit is configured to operate, after moving the tungsten electrode out of contact with the weld puddle, with an arc voltage at least 0.1 V greater than before the contact between the tungsten electrode and the weld puddle.

In some embodiments, the processing circuit is configured to perform a normal sequence stop after moving the tungsten electrode out of contact with the weld puddle.

According to an embodiment of the present disclosure, there is provided a method for welding with a gas tungsten arc welding system, the method including: detecting contact between the tungsten electrode and a weld puddle; and in response to detecting contact between the tungsten electrode and the weld puddle, controlling the electrode position actuator to move the tungsten electrode out of contact with the weld puddle.

In some embodiments, the method further includes maintaining a current through the tungsten electrode, after detecting contact between the tungsten electrode and the weld puddle.

In some embodiments, the method further includes causing shielding gas to continue flowing after detecting contact between the tungsten electrode and the weld puddle.

In some embodiments, the causing the shielding gas to continue flowing includes causing the shielding gas to continue flowing for at least 0.2 seconds after detecting contact between the tungsten electrode and the weld puddle.

In some embodiments, the causing the shielding gas to continue flowing includes causing the shielding gas to continue flowing until a command is received from an operator to shut off the flow of shielding gas.

In some embodiments, the moving of the tungsten electrode includes moving the tungsten electrode up by at least 0.05 inches within 0.5 seconds after detecting contact between the tungsten electrode and the weld puddle.

In some embodiments, the method further includes operating, after moving the tungsten electrode out of contact with the weld puddle, with an arc voltage greater than before the contact between the tungsten electrode and the weld puddle.

In some embodiments, the operating with an arc voltage greater than before the contact between the tungsten electrode includes operating with an arc voltage at least 0.1 V greater than before the contact between the tungsten electrode and the weld puddle.

In some embodiments, the processing circuit is configured to perform a normal sequence stop after moving the tungsten electrode out of contact with the weld puddle.

BRIEF DESCRIPTION OF THE DRAWINGS

These and other features and advantages of the present disclosure will be appreciated and understood with reference to the specification, claims, and appended drawings wherein:

DETAILED DESCRIPTION

The detailed description set forth below in connection with the appended drawings is intended as a description of exemplary embodiments of a system and method for preventing stub-outs in gas tungsten arc welding (GTAW) provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Figure 1:
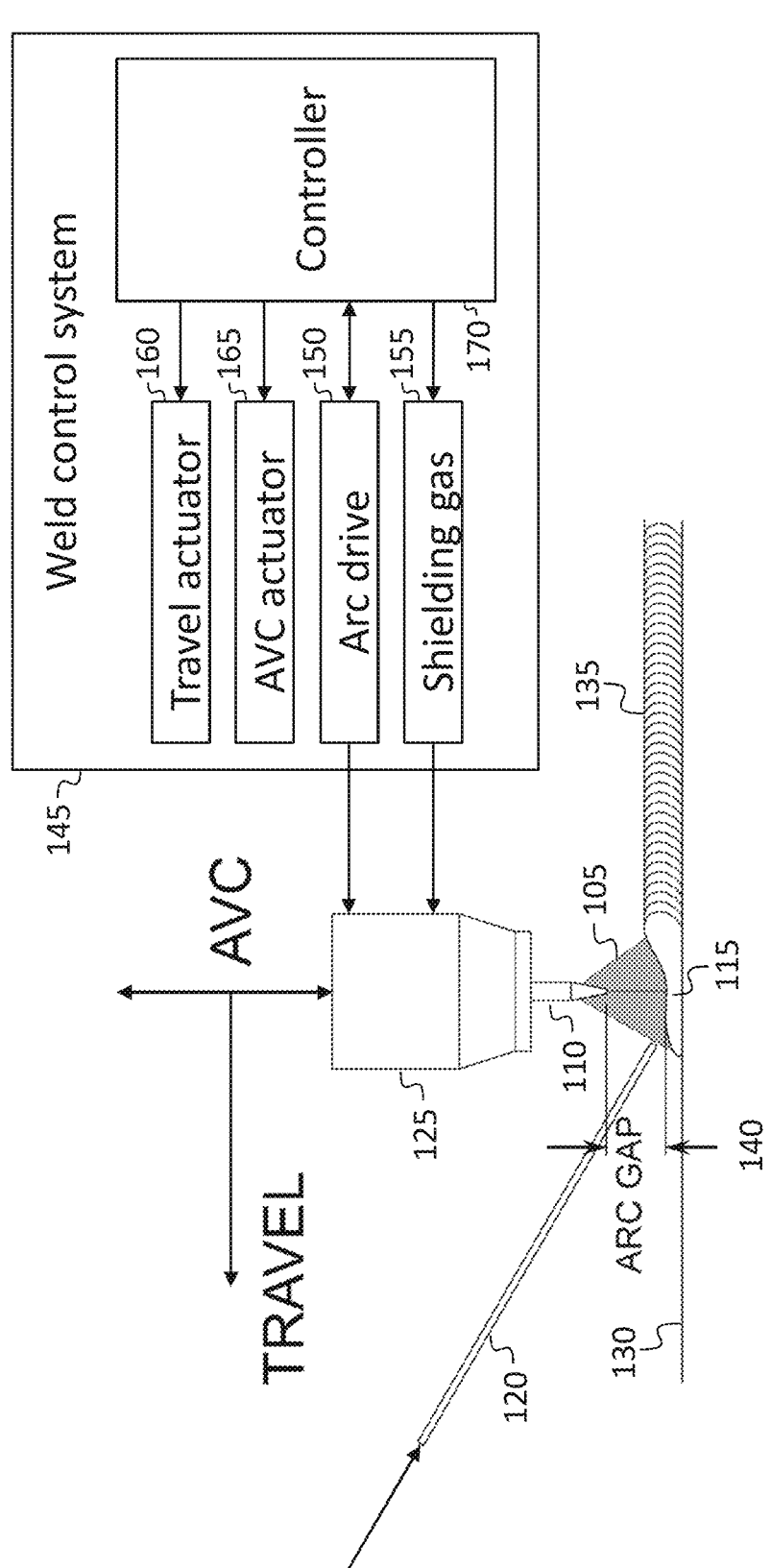
FIG. 1 is a schematic diagram of a system for gas tungsten arc welding, according to an embodiment of the present disclosure.

Referring to FIG. 1, in a gas tungsten arc welding (GTAW) system, the power dissipated in an electric arc 105 between a tungsten electrode 110 and a weld puddle 115 provides heat to keep the weld puddle molten. Filler material (e.g., metal) is added to the weld puddle 115 by a filler rod or filler wire 120. Shielding gas flows from a gas cup 125 onto the weld puddle 115, to protect the weld puddle 115 from contact with the atmosphere. The tungsten electrode 110, the filler wire 120, the gas cup 125, the arc 105, and the weld puddle 115 move relative to a workpiece, or "substrate" 130 (as a result of motion of the workpiece, or as a result of motion of the tungsten electrode 110, or as a result of both), in the direction labeled "TRAVEL", forming a weld 135.

The top surface of the substrate 130 may not be perfectly flat, and, as such, as the weld progresses, the gas cup 125 and the tungsten electrode 110 may move up or down, e.g., under the control of an automatic voltage control (or "arc voltage control") (AVC) system (in the direction labeled "AVC") so as to keep the arc gap 140 (the distance between the tungsten electrode 110 and the weld puddle 115) substantially constant.

A weld control system 145 may control various aspects of the welding process. The weld control system 145 may include an arc drive circuit 150, which may supply current to the arc 105 and a shielding gas controller 155 (which may include a shielding gas valve and a circuit for causing the shielding gas valve to open or close), which may control the flow of shielding gas to the gas cup 125. The travel of the tungsten electrode 110, the filler wire 120, and the gas cup 125 relative to the substrate 130 may be effected by a travel actuator 160, which may include a travel motor and a circuit for driving the travel motor. The travel motor may cause relative motion of (i) an electrode assembly (which may include the tungsten electrode 110, and the gas cup 125) and a filler wire feed unit (which may feed the filler wire 120) and (ii) the substrate 130, using suitable gears, wheels, or linkages, connected to the workpiece or to the electrode assembly and the filler wire feed unit, or both.

The size, or "length" of the arc gap 140 may be controlled by an AVC actuator 165 (which may include an AVC motor (driving suitable gears, wheels, or linkages, connected to the electrode assembly) and a circuit for driving the AVC motor). The arc drive circuit 150, the shielding gas controller 155, the travel actuator 160, and the AVC actuator 165 may be controlled by a controller 170, which may be, or may include, a processing circuit (discussed in further detail below). The arc drive circuit 150 may include circuits for measuring the arc current and the arc voltage, and it may report these measurements to the controller 170. The controller 170 may include various interfaces (e.g., displays or readouts, speakers, a keyboard, a mouse, knobs, switches, and dials) for communicating with an operator supervising the welding process, e.g., for providing information to the operator and for receiving instructions and commands from the operator.

For a fixed welding current (or arc current, i.e., the electric current flowing through the arc 105), the arc voltage (i.e., the voltage drop across the arc) may depend on the length of the arc gap 140, with a longer arc gap 140 requiring a larger arc voltage to drive the same arc current. In operation, the controller 170 may control (i) the arc drive circuit 150 to provide an arc current that is substantially constant and substantially equal to an arc current setpoint, and (ii) the AVC actuator 165 to maintain an arc voltage that is substantially constant and substantially equal to an arc voltage setpoint (e.g., by causing the AVC actuator 165 to increase the length of the arc gap 140 if the arc voltage is less than the arc voltage setpoint, and causing the AVC actuator 165 to decrease the length of the arc gap 140 if the arc voltage is greater than the arc voltage setpoint). The arc current and arc voltage may be set by the operator.

Figure 2A:
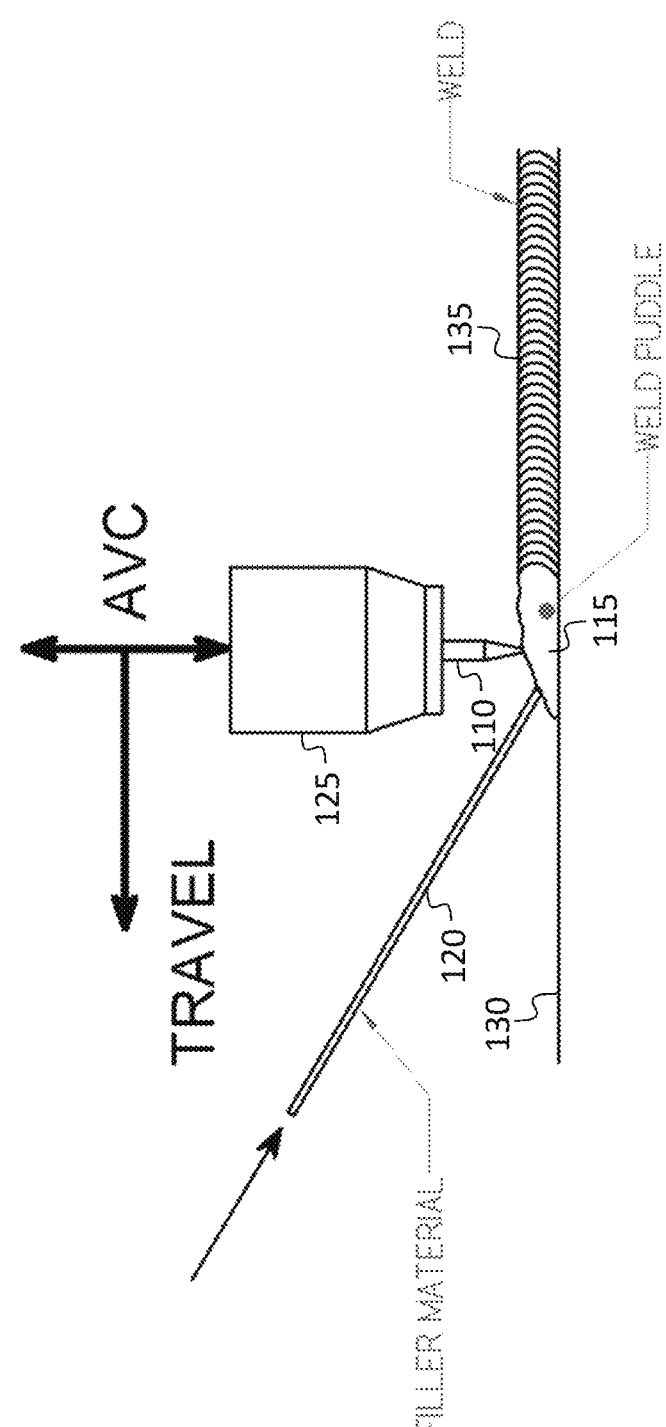
FIG. 2A is a drawing of a gas tungsten arc welding system with contact between the tungsten electrode and the weld puddle, according to an embodiment of the present disclosure.

As mentioned above, in some circumstances, the tungsten electrode 110 may make contact with the weld puddle 115 (as illustrated in FIG. 2A), causing the resistance of the arc 105 to be replaced with a short circuit (or a relatively low resistance). This may occur, for example, if a dip in the surface of the substrate 130 causes the weld control system 145 to begin to lower the tungsten electrode 110, and if a subsequently encountered bump or ridge in the surface of the substrate 130 then causes the weld puddle 115 to move upward at the same time as the tungsten electrode 110 is moving downward; in this situation the weld control system 145 may be incapable of responding quickly enough to avoid contact between the tungsten electrode 110 and the weld puddle 115. Noise in the arc voltage measuring circuit may also cause, or contribute to the occurrence of, contact between the tungsten electrode 110 and the weld puddle 115; e.g., such noise may cause the weld control system 145 to overestimate the arc voltage and the arc gap, and to move the tungsten electrode 110 toward the weld puddle 115 when such motion is not needed. Stub-out conditions may also be caused by weld puddle fluctuations due to filler metal addition 120 or external factors, substrate 130 or weld joint geometry, steering, or operator arc gap 140 setting.

Figure 2B:
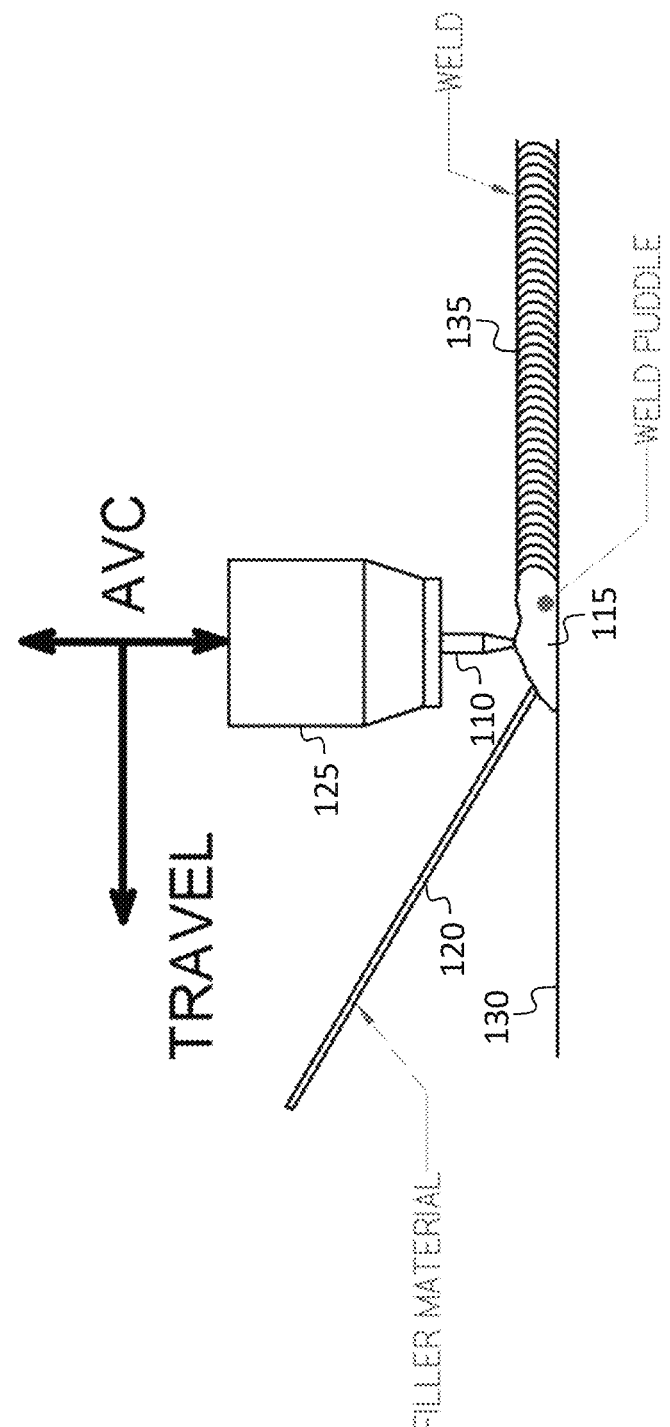
FIG. 2B is a drawing of a gas tungsten arc welding system in which the weld puddle has solidified around the tungsten electrode.

In a related art welding system, such contact between the weld puddle 115 and the tungsten electrode 110 may result in a "stub-out", as follows. Upon detecting the short circuit (i.e., the drop to nearly zero of the measured arc voltage), the weld control system 145 may perform an "all stop", i.e., it may shut off (i) the welding current (ii) the shielding gas flow, (iii) the travel actuator 160 and (iv) the AVC actuator 165. This may result in the weld puddle solidifying around the tungsten electrode 110 (as shown in FIG. 2B), and the formation of a weld crater that may crack during solidification.

Figure 2C:
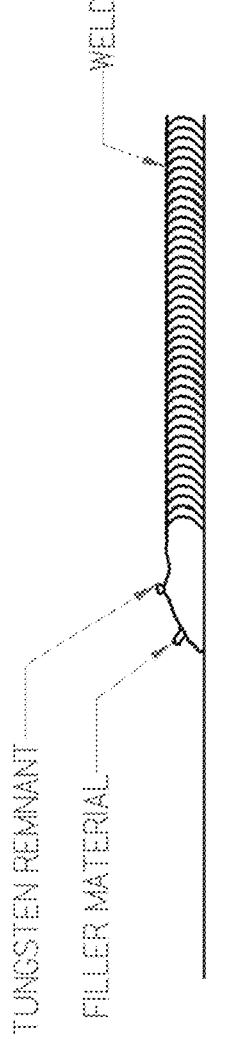
FIG. 2C is a drawing of a step in recovering from a stub-out.
Figure 2D:
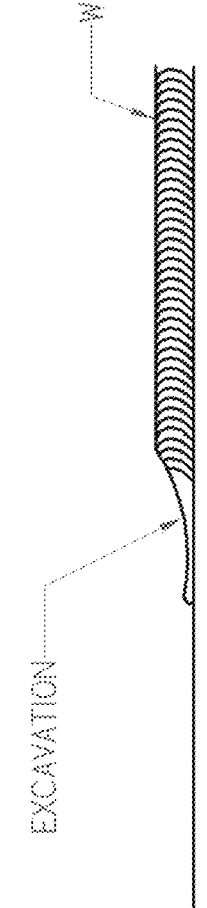
FIG. 2D is a drawing of a step in recovering from a stub-out.

The procedure for recovering from a stub-out may include (i) cutting the filler wire as close to the weld as possible if it is solidified in the weld, (ii) breaking the tungsten tip off in the weld (as shown in FIG. 2C), (iii) moving the weld head or torch (including the tungsten electrode 110 and the gas cup 125) away from stub-out site, or removing the weld head from the workpiece 130 entirely, if necessary to gain adequate access, (iv) filing or grinding out the tungsten inclusion and any oxidation (as shown in FIG. 2D), (v) inspecting the removal area for cracks, oxidation, and any tungsten remnant, (vi) manually welding the repair removal site if needed, (vii) reinstalling the weld head if needed, (viii) installing a new tungsten electrode 110 in the weld head, (ix) adjusting the torch angle, wire feed angle, wire to tungsten gap, etc., and (x) resuming welding.

In some embodiments, some or all of these recovery steps may be avoided using a system and method for avoiding stub-outs. In such an embodiment, when the tungsten electrode 110 contacts the weld puddle 115, the controller 170 detects the contact (e.g., by detecting an abrupt drop, to nearly zero, in the measured arc voltage, as reported by the arc drive circuit 150), and, instead of shutting off the welding current and the shielding gas, the controller 170 causes the welding current and shielding gas to continue to flow (by sending appropriate commands to the arc drive circuit 150 and to the shielding gas controller 155), and moves (e.g., lifts) the tungsten electrode 110 away from the weld puddle 115 (by sending appropriate commands to the AVC actuator 165) so that it is no longer in contact with the weld puddle. Upon detection of contact between the tungsten electrode 110 and the weld puddle 115, the controller 170 may stop the travel actuator 160 or cause the travel actuator 160 to continue to operate (by sending appropriate commands to the travel actuator 160).

When contact between the tungsten electrode 110 and the weld puddle 115 occurs, the weld puddle 115 may begin solidifying, because although current continues to flow, the voltage drop across the tungsten electrode 110 and the substrate 130 is small and little power is being deposited into the weld puddle. The moving away of the tungsten electrode 110 from the weld puddle 115 may be relatively rapid (e.g., the tungsten electrode 110 may be moved upward a predetermined distance (e.g., through a distance of at least 0.005 inches (e.g., through a distance of between 0.005 inches and 0.3 inches)), in a pre-set time interval (e.g., in a time interval of less than 0.5 seconds (e.g., in a time interval of between 0.01 seconds and 0.5 seconds)) so that the tungsten electrode 110 is pulled clear of the weld puddle 115 before the weld puddle 115 solidifies sufficiently (i) to adhere to the tungsten electrode 110 or (if the travel actuator 160 continues to operate) (ii) to damage the tungsten electrode 110. The arc 105 is then re-established as direct contact between the tungsten electrode 110 and the weld puddle 115 is lost, and the weld may then be continued without solidification or oxidation of the weld puddle. If there is damage to the electrode or if it is fouled (e.g., as determined by the operator, who may inspect the tungsten electrode 110), the operator may perform a normal sequence stop with a gradual arc decay (i.e., with the arc current being gradually decreased to zero), and with shielding gas continuing to flow while the weld is sufficiently hot to interact with the atmosphere (the continued flow of shielding gas may be referred to as "weld puddle protection"). The execution of a normal sequence stop after rapid withdrawal of the tungsten electrode 110 from the weld puddle 115 may leave a proper weld puddle contour that is resistant to cracking, not oxidized, and without tungsten remnants in the weld.

In some embodiments, the arc voltage setpoint is increased immediately after a recovery from contact between the tungsten electrode 110 and the weld puddle 115, so that welding continues, after contact between the tungsten electrode 110 and the weld puddle, with an arc voltage greater than before the contact between the tungsten electrode and the weld puddle, and a recurrence of such contact is less likely as the weld continues. For example, the arc voltage setpoint may be increased by an amount between 0.1 V and 2.0 V, e.g., by 0.5 V or by 1.0 V.

In some embodiments, the behavior of the weld control system 145 upon detection of contact between the tungsten electrode 110 and the weld puddle 115 is configurable by the operator. For example, the default behavior of the controller 170 after contact between the tungsten electrode 110 and the weld puddle 115 is detected may be to retract the tungsten electrode 110 (i.e., to move the tungsten electrode 110 away from the weld puddle 115) and continue welding, or it may be to retract the tungsten electrode 110 and perform a sequence stop, or it may be to perform an all-stop. The operator may be able to configure the system to follow one of these default behaviors, and the operator may be able to override the default behavior during operation. For example, if the controller 170 is configured to continue welding after contact between the tungsten electrode 110 and the weld puddle 115 is detected, it may, upon detecting such contact, generate a beep or other warning sound, withdraw the tungsten electrode 110 from the weld puddle 115, and continue welding. The operator, alerted by the warning sound, may inspect the tungsten electrode 110, and, if the operator determines that the tungsten electrode 110 is fouled, the operator may command the controller 170 to perform a sequence stop, or the operator may manually decrease the current (e.g., by turning an arc current setpoint dial) and then shut off the shielding gas.

A sequence stop may be performed by the operator (as described above) or (autonomously) by the controller 170. When the controller 170 performs a sequence stop, it may gradually decrease the arc current (e.g., decreasing the arc current to zero over an interval having a length of at least 0.1 seconds (e.g., an interval having a length between 0.1 and 5.0 seconds (e.g., 1.5 seconds)), or over an interval having a length of at least 0.2 seconds) and it may then allow the shielding gas to continue flowing, (i) until the operator instructs the system to shut off the shielding gas, or (ii) until the arc current has decreased to zero and during a post-purge interval after the arc current has decreased to zero. The post-purge interval may be an interval having a length of at least 0.1 seconds (e.g., an interval having a length between 0.1 seconds and 5.0 seconds).

In some embodiments the default behavior of the system after contact between the tungsten electrode 110 and the weld puddle 115 depends on the type of tungsten electrode 110 installed. A lanthanated tungsten electrode 110 may be more likely to become fouled, or coated with filler material after contact between the tungsten electrode 110 and the weld puddle 115, than a thoriated tungsten electrode 110, and, as such, the system may be configured, by default, to (i) continue welding after contact between the tungsten electrode 110 and the weld puddle 115 when a thoriated tungsten electrode 110 is installed, and to (ii) perform a sequence stop after contact between the tungsten electrode 110 and the weld puddle 115 when a lanthanated tungsten electrode 110 is installed. In such a system, the operator may indicate to the controller 170, whenever a new tungsten electrode 110 is installed, what type of tungsten electrode 110 is being installed, and the controller 170 may use this information for subsequent welding operations.

Various voltage and current waveforms may be used in gas tungsten arc welding. As used herein, the "instantaneous arc voltage" means the arc voltage at any instant in time, and the "arc voltage" means the average of the instantaneous arc voltage over one cycle of the waveform.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, when a second quantity is "within Y" of a first quantity X, it means that the second quantity is at least X-Y and the second quantity is at most X+Y. As used herein, when a second number is "within Y %" of a first number, it means that the second number is at least (1-Y/100) times the first number and the second number is at most (1+Y/100) times the first number. As used herein, the word "or" is inclusive, so that, for example, "A or B" means any one of (i) A, (ii) B, and (iii) A and B.

As mentioned above, the controller 170 may be or include a processing circuit. The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

It will be understood that when an element is referred to as being "directly connected" or "directly coupled" to another element, there are no intervening elements present. As used herein, "generally connected" means connected by an electrical path that may contain arbitrary intervening elements, including intervening elements the presence of which qualitatively changes the behavior of the circuit. As used herein, "connected" means (i) "directly connected" or (ii) connected with intervening elements, the intervening elements being ones (e.g., low-value resistors or inductors, or short sections of transmission line) that do not qualitatively affect the behavior of the circuit.

Although exemplary embodiments of a system and method for preventing stub-outs in GTAW have been specifically described and illustrated herein, many modifications and variations will be apparent to those skilled in the art. Accordingly, it is to be understood that a system and method for preventing stub-outs in GTAW constructed according to principles of this disclosure may be embodied other than as specifically described herein. The invention is also defined in the following claims, and equivalents thereof.

What is claimed is:

1. A method for welding with a gas tungsten arc welding system, the method comprising:
    detecting contact between a tungsten electrode, of the gas tungsten arc welding system, and a weld puddle;
    in response to detecting contact between the tungsten electrode and the weld puddle, controlling an electrode position actuator, of the gas tungsten arc welding system, to move the tungsten electrode out of contact with the weld puddle; and
    maintaining a current through the tungsten electrode, after detecting contact between the tungsten electrode and the weld puddle.

2. The method of claim 1, further comprising causing shielding gas to continue flowing after detecting contact between the tungsten electrode and the weld puddle.

3. The method of claim 2, wherein the causing the shielding gas to continue flowing comprises causing the shielding gas to continue flowing for at least 0.2 seconds after detecting contact between the tungsten electrode and the weld puddle.

4. The method of claim 2, wherein the causing the shielding gas to continue flowing comprises causing the shielding gas to continue flowing until a command is received from an operator to shut off the flow of shielding gas.

5. The method of claim 2, wherein the moving of the tungsten electrode comprises moving the tungsten electrode up by at least 0.05 inches within 0.5 seconds after detecting contact between the tungsten electrode and the weld puddle.

6. The method of claim 1, further comprising operating, after moving the tungsten electrode out of contact with the weld puddle, with an arc voltage greater than before the contact between the tungsten electrode and the weld puddle.

7. The method of claim 1, further comprising performing a normal sequence stop after moving the tungsten electrode out of contact with the weld puddle.

8. A method for welding with a gas tungsten arc welding system, the method comprising:
    detecting contact between a tungsten electrode, of the gas tungsten arc welding system, and a weld puddle;
    in response to detecting contact between the tungsten electrode and the weld puddle, controlling an electrode position actuator, of the gas tungsten arc welding system, to move the tungsten electrode out of contact with the weld puddle; and
    operating, after moving the tungsten electrode out of contact with the weld puddle, with an arc voltage greater than before the contact between the tungsten electrode and the weld puddle.

9. The method of claim 8, wherein the operating with an arc voltage greater than before the contact between the tungsten electrode comprises operating with an arc voltage at least 0.1 V greater than before the contact between the tungsten electrode and the weld puddle.

10. The method of claim 8, further comprising performing a normal sequence stop after moving the tungsten electrode out of contact with the weld puddle.

11. The method of claim 8, further comprising maintaining a current through the tungsten electrode, after detecting contact between the tungsten electrode and the weld puddle.

12. The method of claim 8, further comprising causing shielding gas to continue flowing after detecting contact between the tungsten electrode and the weld puddle.

13. The method of claim 12, wherein the causing the shielding gas to continue flowing comprises causing the shielding gas to continue flowing for at least 0.2 seconds after detecting contact between the tungsten electrode and the weld puddle.

14. The method of claim 12, wherein the causing the shielding gas to continue flowing comprises causing the shielding gas to continue flowing until a command is received from an operator to shut off the flow of shielding gas.

15. The method of claim 8, wherein the moving of the tungsten electrode comprises moving the tungsten electrode up by at least 0.05 inches within 0.5 seconds after detecting contact between the tungsten electrode and the weld puddle.

16. The method of claim 6, wherein the operating with an arc voltage greater than before the contact between the tungsten electrode comprises operating with an arc voltage at least 0.1 V greater than before the contact between the tungsten electrode and the weld puddle.

* * * * *